(12) United States Patent
Salmikuukka

(10) Patent No.: US 11,697,572 B2
(45) Date of Patent: Jul. 11, 2023

(54) REMOTE CALL AND MOBILE ACCESS EXTENSION FOR CONTROLLING AN ELEVATOR OR A DOOR KEY

(71) Applicant: KONE Corporation, Helsinki (FI)

(72) Inventor: Jukka Salmikuukka, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1223 days.

(21) Appl. No.: 16/172,163

(22) Filed: Oct. 26, 2018

(65) Prior Publication Data

US 2019/0062107 A1 Feb. 28, 2019

Related U.S. Application Data

(63) Continuation of application No. PCT/EP2016/059640, filed on Apr. 29, 2016.

(51) Int. Cl.
*B66B 1/46* (2006.01)
*B66B 1/24* (2006.01)
*H04W 4/80* (2018.01)

(52) U.S. Cl.
CPC .......... *B66B 1/468* (2013.01); *B66B 1/2408* (2013.01); *B66B 2201/103* (2013.01); *B66B 2201/104* (2013.01); *B66B 2201/4653* (2013.01); *B66B 2201/4676* (2013.01); *H04W 4/80* (2018.02)

(58) Field of Classification Search
CPC . B66B 1/468; B66B 1/2408; B66B 2201/103; B66B 2201/104; B66B 2201/4653; B66B 2201/4676; H04W 4/80

USPC ........................................................ 187/380
See application file for complete search history.

(56) References Cited

U.S. PATENT DOCUMENTS

| 5,689,094 A | 11/1997 | Friedli et al. | |
|---|---|---|---|
| 5,984,051 A * | 11/1999 | Morgan | B66B 1/2408 187/316 |
| 6,397,976 B1 * | 6/2002 | Hale | B66B 1/2408 187/389 |
| 7,552,800 B2 * | 6/2009 | Puskala | B66B 1/468 187/392 |
| 7,766,129 B2 * | 8/2010 | Makela | B66B 1/20 187/382 |

(Continued)

FOREIGN PATENT DOCUMENTS

| CN | 1752396 A | 3/2006 | |
|---|---|---|---|
| EP | 1024103 A1 * | 8/2000 | ............ B66B 1/468 |

(Continued)

OTHER PUBLICATIONS

International Search Report issued in PCT/EP2016/059640 (PCT/ISA/210), dated Feb. 2, 2017.

(Continued)

*Primary Examiner* — Mahendra R Patel
(74) *Attorney, Agent, or Firm* — Birch, Stewart, Kolasch & Birch, LLP

(57) ABSTRACT

An apparatus and a method are disclosed by which it is determined whether a receiver has received an object identifier, and wherein, in case the receiver has received the object identifier, entry control information is created based on the object identifier, and in case the receiver has not received the object identifier, the entry control information is created based on default information.

20 Claims, 4 Drawing Sheets

(56) References Cited

U.S. PATENT DOCUMENTS

| | | | |
|---|---|---|---|
| 8,151,942 B2 * | 4/2012 | Rusanen | B66B 1/468 |
| | | | 187/247 |
| 9,323,232 B2 * | 4/2016 | Blom | G06Q 10/04 |
| 10,055,657 B2 * | 8/2018 | Fang | B66B 1/3476 |
| 10,173,862 B2 * | 1/2019 | Colombano | B66B 1/3423 |
| 2004/0262619 A1 * | 12/2004 | Takahashi | H01L 27/1446 |
| | | | 257/E27.129 |
| 2006/0065490 A1 * | 3/2006 | Zaharia | B66B 1/468 |
| | | | 187/384 |
| 2009/0014516 A1 * | 1/2009 | Kshirsagar | G09B 29/106 |
| | | | 235/382.5 |
| 2009/0057068 A1 | 3/2009 | Lin et al. | |
| 2015/0321881 A1 * | 11/2015 | Salmikuukka | G01C 21/206 |
| | | | 187/247 |
| 2016/0031675 A1 | 2/2016 | Silvennoinen et al. | |
| 2016/0152439 A1 * | 6/2016 | MacDonald | B66B 1/46 |
| | | | 187/380 |

FOREIGN PATENT DOCUMENTS

| | | | | | |
|---|---|---|---|---|---|
| EP | 2 704 105 A1 | | 3/2014 | | |
| EP | 2 704 106 A1 | | 3/2014 | | |
| EP | 2704105 A1 | * | 3/2014 | | B66B 1/468 |
| JP | 1-247380 A | | 10/1989 | | |
| JP | 2-255487 A | | 10/1990 | | |
| JP | 10173862 A | * | 6/1998 | | |
| JP | 2004262619 A | * | 9/2004 | | |
| JP | 2009-299424 A | | 12/2009 | | |
| JP | 2010-30757 A | | 2/2010 | | |
| JP | 2012-131588 A | | 7/2012 | | |
| WO | WO-0075062 A1 | * | 12/2000 | | B66B 1/468 |
| WO | WO-2006001804 A2 | * | 1/2006 | | B66B 1/46 |
| WO | WO 2006/017881 A2 | | 2/2006 | | |
| WO | WO-2015012787 A1 | * | 1/2015 | | B66B 1/46 |
| WO | WO 2015/191345 A1 | | 12/2015 | | |
| WO | WO 2017/175021 A1 | | 10/2017 | | |

OTHER PUBLICATIONS

Written Opinion of the International Searching Authority issued in PCT/EP2016/059640 (PCT/ISA/237), dated Feb. 2, 2017.
"Asset Tracking Ebook: A Practical Guide for Tracking Hardware and Other Fixed Assets", Amitracks, May 2012, pp. 1-41.
European Notice of Opposition for European Application No. 16723952.4, dated Mar. 14, 2022.

* cited by examiner

REMOTE CALL AND MOBILE ACCESS EXTENSION FOR CONTROLLING AN ELEVATOR OR A DOOR KEY

CROSS REFERENCE TO RELATED APPLICATIONS

This application is a Continuation of PCT International Application No. PCT/EP2016/059640, filed on Apr. 29, 2016, of which is hereby expressly incorporated by reference into the present application.

FIELD OF THE INVENTION

The present invention relates to an apparatus, a method and a computer program product for controlling an elevator or a door key.

RELATED BACKGROUND ART

The following description of background art and examples may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

Some examples of the present disclosure relate to elevators and/or automatic door keys, and in particular to a so-called remote call-giving application. The remote call-giving application (either implemented into an entrance door access reader or a mobile application) can create an automated call to a so-called "home floor" which is defined for each user separately. That is, for example the mobile application on a mobile phone of the user sends information regarding the target floor, e.g., the home floor mentioned above, to a control system of the elevator, and the elevator automatically sets the home floor as the destination floor. Alternatively, the entrance door access reader reads some ID information from e.g., a mobile phone of the user, and sets, based on this ID information, the home floor of the user as the destination floor. Thus, the user is not required to input the destination floor manually.

However, this scenario may be disadvantageous e.g. in residential buildings in situations where the behavior of the individual alters from the "default", meaning that he/she does not go directly to the home.

This may occur e.g. in situation where a person arrives home with the bike and takes it first to bike storage in the basement after that gets to the home. With the current applications, the automatic home floor call creates a false call, namely such that the home floor of the user is set as the destination floor. Thus, an unnecessary ride is caused, reducing the elevator system capacity from the other users and at the same time the remote call giving application fails in providing the improved end-user experience. This limited capability reduces the overall attractiveness of remote call giving functionality in general.

SUMMARY OF THE INVENTION

Thus, it is an object of the present invention to overcome this disadvantages and to provide a method and an apparatus by which the capability of the remote call giving functionality is enhanced.

According to a first aspect of the present invention an apparatus is provided which comprises a receiver for receiving identifiers, and a controller, wherein the controller is configured to determine whether the receiver has received an object identifier, to create, in case the receiver has received the object identifier, entry control information based on the object identifier, and to create, in case the receiver has not received the object identifier, the entry control information based on default information.

According to a second aspect of the present invention a method is provided which comprises:
  determining whether a receiver has received an object identifier,
  creating, in case the receiver has received the object identifier, entry control information based on the object identifier, and
  creating, in case the receiver has not received the object identifier, the entry control information based on default information.

The first and second aspects may be modified as follows:
The apparatus may be or may be a part a mobile device, or the method may be carried out in a mobile device, wherein the created entry control information may be sent to an elevator control system or a door key control system.

Alternatively, the apparatus may be or may be part of an elevator control system or a door key control system, or the method may be carried out in a door key control system, and the receiver may be configured to receive a user identifier, wherein in case the receiver has received the user identifier, it may be determined whether the receiver has received the object identifier.

In this case, it may be determined whether the user identifier and the object identifier correspond to each other.

The entry control information may comprise destination indication information for an elevator. In this case, default destination indication information may be created as the entry control information when no object identifier is received, and object related destination indication information may be created as the entry control information when the object identifier is received.

The entry control information may comprise door key control information for an automatic door key. In this case, default door key control information may be created as the entry control information when no object identifier is received, and object related door key information may be created as the entry control information when the object identifier is received.

The entry control information to be created based on the object identifier may be configurable by a user.

According to a third aspect, an apparatus is provided which comprises a receiver and a controller, wherein the controller is configured to detect whether an object is present by checking whether the receiver receives an object identifier corresponding to the object, to determine that an object is removed when the object identifier is no longer received, and to issue a warning when the object is removed while no user identifier corresponding to the object identifier is received.

The third aspect may be modified as follows:
The controller may be configured to operate a lock for the object, and to open the lock for the object when a user identifier corresponding to the object identifier is received.

The controller may be configured to receive an instruction from the user corresponding to the user identifier to override issuing the warning.

The controller may be configured to receive an instruction from the user corresponding to the user identifier to open the lock for the object and to open the lock based on the received instruction.

According to a fourth aspect, a method is provided which comprises
  detecting whether an object is present by checking whether a receiver receives an object identifier corresponding to the object,
  determining that an object is removed when the object identifier is no longer received, and
  issuing a warning when the object is removed while no user identifier corresponding to the object identifier is received.

The fourth aspect may be modified as follows:
The method may further comprise
operating a lock for the object, and
  opening the lock for the object when a user identifier corresponding to the object identifier is received.

The method may further comprise receiving an instruction from the user corresponding to the user identifier to override issuing the warning.

The method may further comprise receiving an instruction from the user corresponding to the user identifier to open the lock for the object and to open the lock based on the received instruction.

According to a further aspect, a system is provided which comprises an apparatus according to any of the first and third aspects and their modifications, and an object device for providing the object identifier.

The system may both comprise an apparatus according to the first aspect and an apparatus according to the third aspect.

The object device may comprise a transmitter for transmitting the object identifier or means for providing a radio frequency identification.

The object device may be a tag which can be removably attached to an object.

In addition, according to another aspect of the present invention, there is provided a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer or transmittable via a network by means of at least one of upload, download and push procedures.

According to a still further aspect of the present invention an apparatus is provided which comprises means for determining whether an object identifier has been received, means for creating, in case the object identifier has been received, entry control information based on the object identifier, and means for creating, in case the receiver has not received the object identifier, the entry control information based on default information.

According to another aspect, an apparatus is provided which comprises means for detecting whether an object is present by checking whether a receiver receives an object identifier corresponding to the object, means for determining that an object is removed when the object identifier is no longer received, and means for issuing a warning when the object is removed while no user identifier corresponding to the object identifier is received.

The above aspects may be modified similar to the first and third aspects described above.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

It is to be noted that the following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

Figure 1:
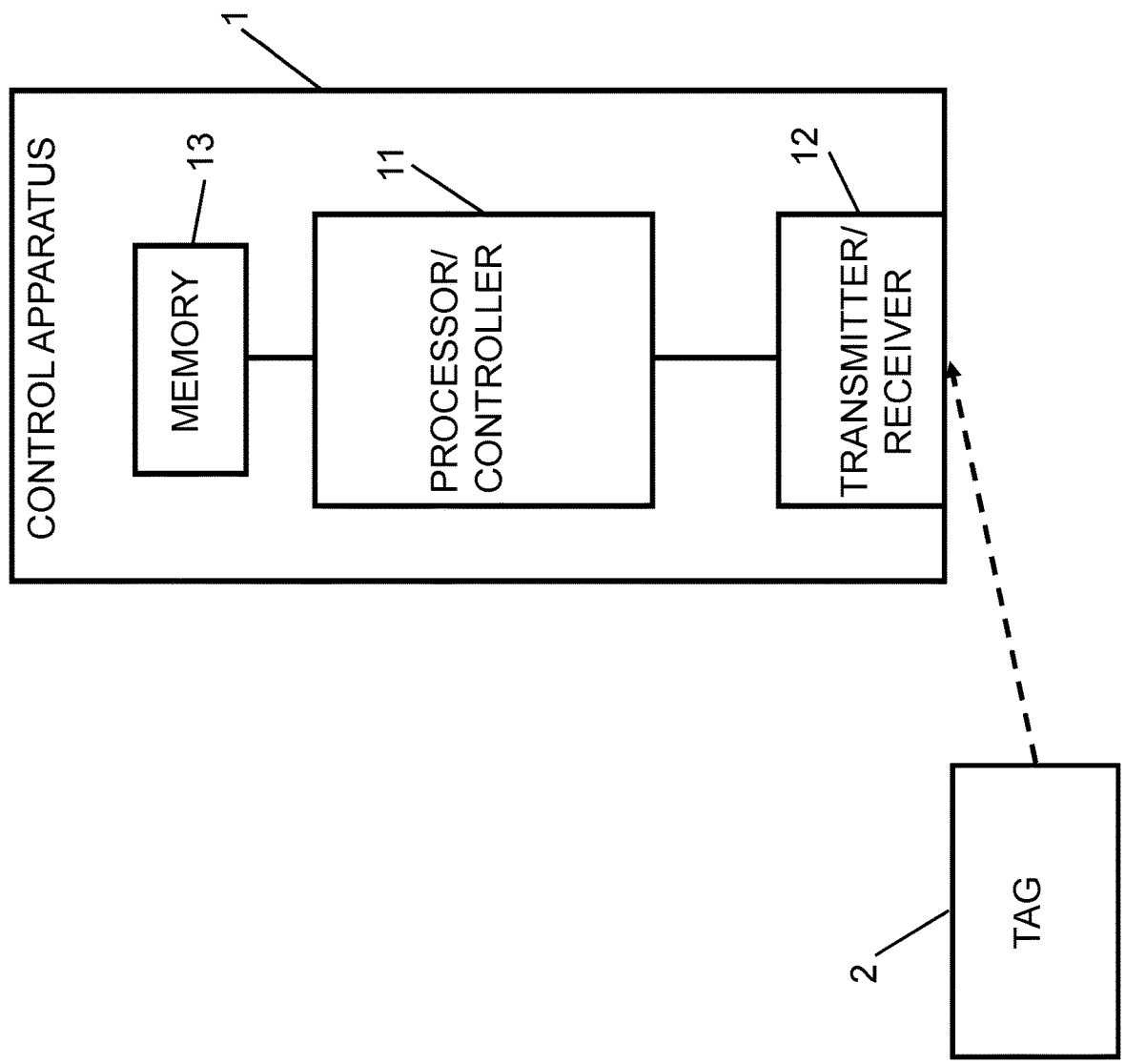
FIG. 1 shows a control apparatus according to some embodiments of the present invention.

FIG. 1 shows a schematic diagram illustrating a configuration of a general control apparatus in which some examples of embodiments are implementable. In particular, the control apparatus comprises a processor or controller 11, and a transmitter/receiver 12. The control apparatus may further comprise a memory 13 in which programs to be carried out and data required are stored.

It is noted that the transmitter/receiver 12 may also be a receiver only, i.e., the transmitter part or functionality is optional.

The controller 11 is configured to determine whether the receiver has received an object identifier (e.g., from a tag 2 shown in FIG. 1), to create, in case the receiver has received the object identifier, entry control information based on the object identifier, and to create, in case the receiver has not received the object identifier, the entry control information based on default information.

Hence, according to this general embodiment, it is checked whether an object identifier is received, e.g., from a tag attached to a certain object. If this is the case, the entry control information is created based on this object identifier, otherwise based on default information.

A more concrete application is for example the use in connection with an elevator.

In this case, the entry control information specifies or indicates a destination indication information, e.g., a destination floor. When no object is detected, i.e., when no object identifier is received, the default information is used. That is, for example the home floor of a user is set as the destination floor. When an object identifier is received, an object related destination floor is set as the destination floor.

Figure 2:
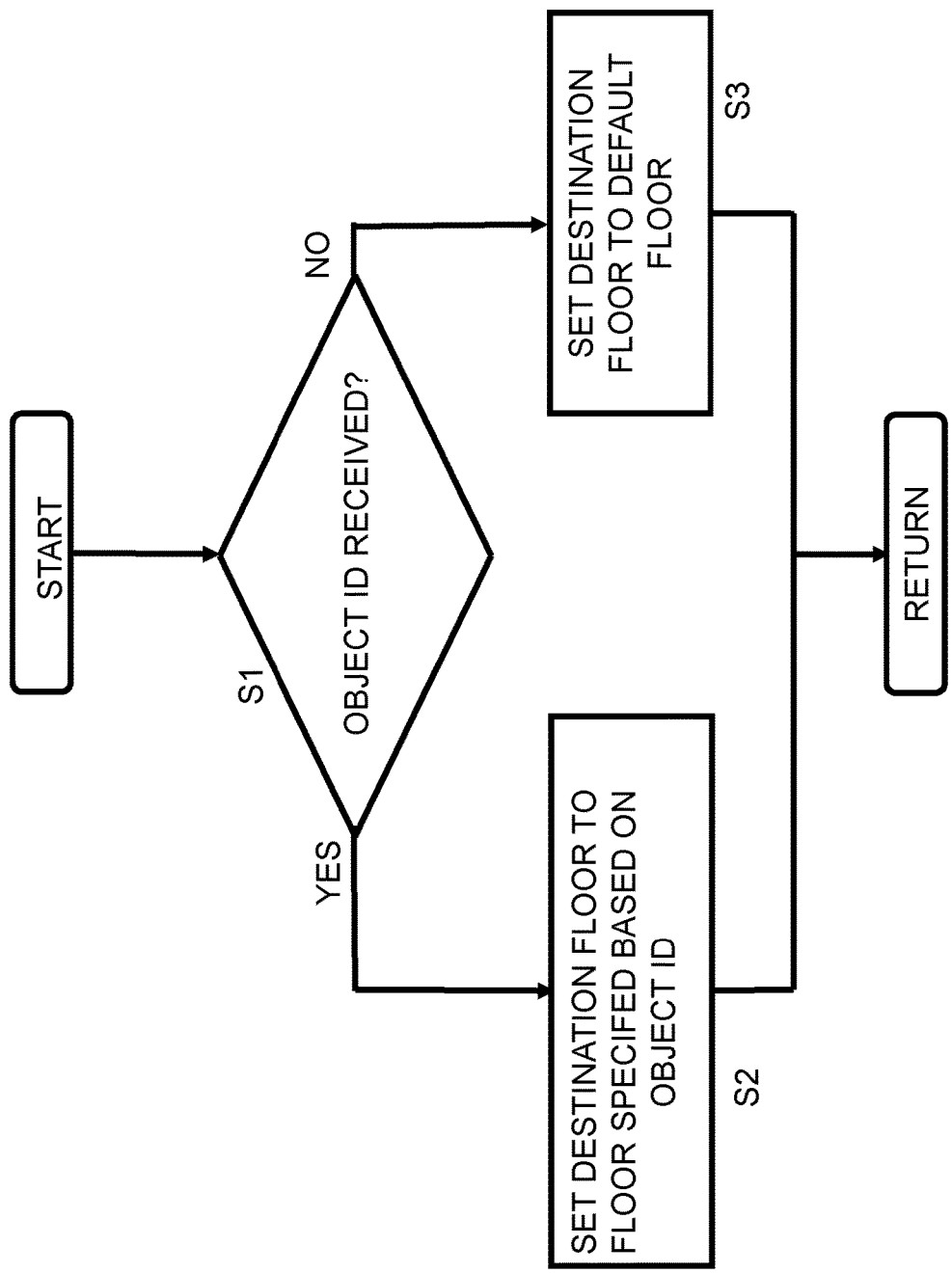
FIG. 2 shows a method according to some embodiments of the present invention.

This process is shown in FIG. 2. In step S1, it is detected whether an object ID (object identifier) has been received. If yes, then the destination floor is set based on the object ID in step S2 (e.g., the destination floor is set to a floor on which a bike storage is located, in case the object is a bike). Otherwise, (no in step S1), the destination floor is set to a default floor (e.g., home floor of the user) in step S3.

The control apparatus may be provided in a mobile device of a user, or may be provided in an elevator control system or a door key control system.

In the following, some more detailed embodiments are described.

According to a first embodiment, the control apparatus is provided in a mobile device of a user and is used in connection with an elevator. For example, the control apparatus is provided in a mobile phone (also referred to as MOP) with a corresponding application program (app).

According to the first embodiment, a simple, removable sensor is added that is recognized by the remote call giving application, i.e., the above-reference application program. For example, such a sensor may be, for example, a transmitter such as a Bluetooth beacon or the like, or may be a long range RFID wireless identifier.

In case of a phone app (i.e., the application running on the mobile phone as mentioned above) the logic is as stated below:

In the app, the user specifies the home floor, and alternative floor for each sensor he/she has.

The user attaches the sensor that is defined to be for example a "bike storage floor"-tag to a bike.

Now, when user approaches with the bike the main entrance and the "bike storage" tag is recognized together with the user, the automated elevator-call is made to the bike storage floor instead of the home floor.

When user leaves the bike to the storage, and the connection between the mobile app and tag breaks, this triggers automated call from storage floor to real home floor.

That is, according to the present embodiment, instead of generating automatic call to user's home floor, a call to another floor is generated depending on object(s) (bike etc.) with some identifier (for example Bluetooth beacon, long range RFID etc. wireless identifier).

Thus, summarizing, according to the first embodiment, a user may have a mobile phone (MOP with an application program) that is able to read object's ID. When a user approaches for example main entrance of his/her residence building, MOP automatically send a destination call (start floor, target floor) to the elevator system to defined floor or alternatively MOP send object ID and user ID (phone number for ex.) to some background system that will generate the defined destination call. Destination floors for each object ID are be configurable by the user.

An approach of the user to the main entrance etc. points in the building can be detected based on a GPS signal, or there can be close the point some wireless identifier (location ID) that can be read by MOP.

That is, the general procedure as described above in connection with FIG. 2 can be started when it is detected that the user has approached the main entrance or the like.

According to a second embodiment, the control apparatus is provided in an elevator control system.

Thus, according to the second embodiment, the determination whether an object ID is received or not (step S1 in FIG. 2) is not carried out by a mobile phone of the user, but by an elevator control system.

In this case, the user has to have some identifier (Bluetooth, RFID), and when approaching the main entrance etc., a reader at the point reads both user ID and object's ID and send both to a background system that generates the defined destination call based on IDs.

That is, similar as described above in connection with FIG. 2, when the reader (as an example for a receiver) receives both a user ID and an object ID, the destination floor is set to, e.g., a bike storage floor. When only a user ID and no object ID is received, then the destination floor is set to the home floor.

The first and second embodiments may also be modified such that they are not used in connection with an elevator, but with door keys. This is described in the following as third and fourth embodiments.

In this case, the entry control information specifies or indicates a door key control information for a door key (e.g., an automatic door key which may be remotely opened or locked). When no object is detected, i.e., when no object identifier is received, the default information is used. That is, for example home door key control information for controlling a home door of a user (e.g., entrance door to his flat) is set as the door key control information. When an object identifier is received, an object related door key control information is set as the door key control information.

The third embodiment is a modification of the first embodiment, namely such that the control apparatus is provided on a mobile phone of the user. Then, the door key scenario is as follows:

When an object ID (e.g., a tag) is detected with the app, the bike storage door locking is automatically opened instead of a possible other door. If the tag is not detected by the app, the bike storage door lock is not opened.

The fourth embodiment is a modification of the third embodiment, namely such that the control apparatus (FIG. 1) is provided in a door control system.

In the example of the bike storage door as mentioned above, the door control system checks whether it detects the object ID (i.e., the object ID provided by the tag attached to the bike) and a user ID (which may be provided by tag carried by a user or by a mobile phone carried by the user). If both are present, then the bike storage door is opened.

Thus, according to the third and fourth embodiments, security can be enhanced, and at the same time easy handling for the user is achieved.

According to a fifth embodiment, a possible extension to the above-described procedures is described.

Figure 3:
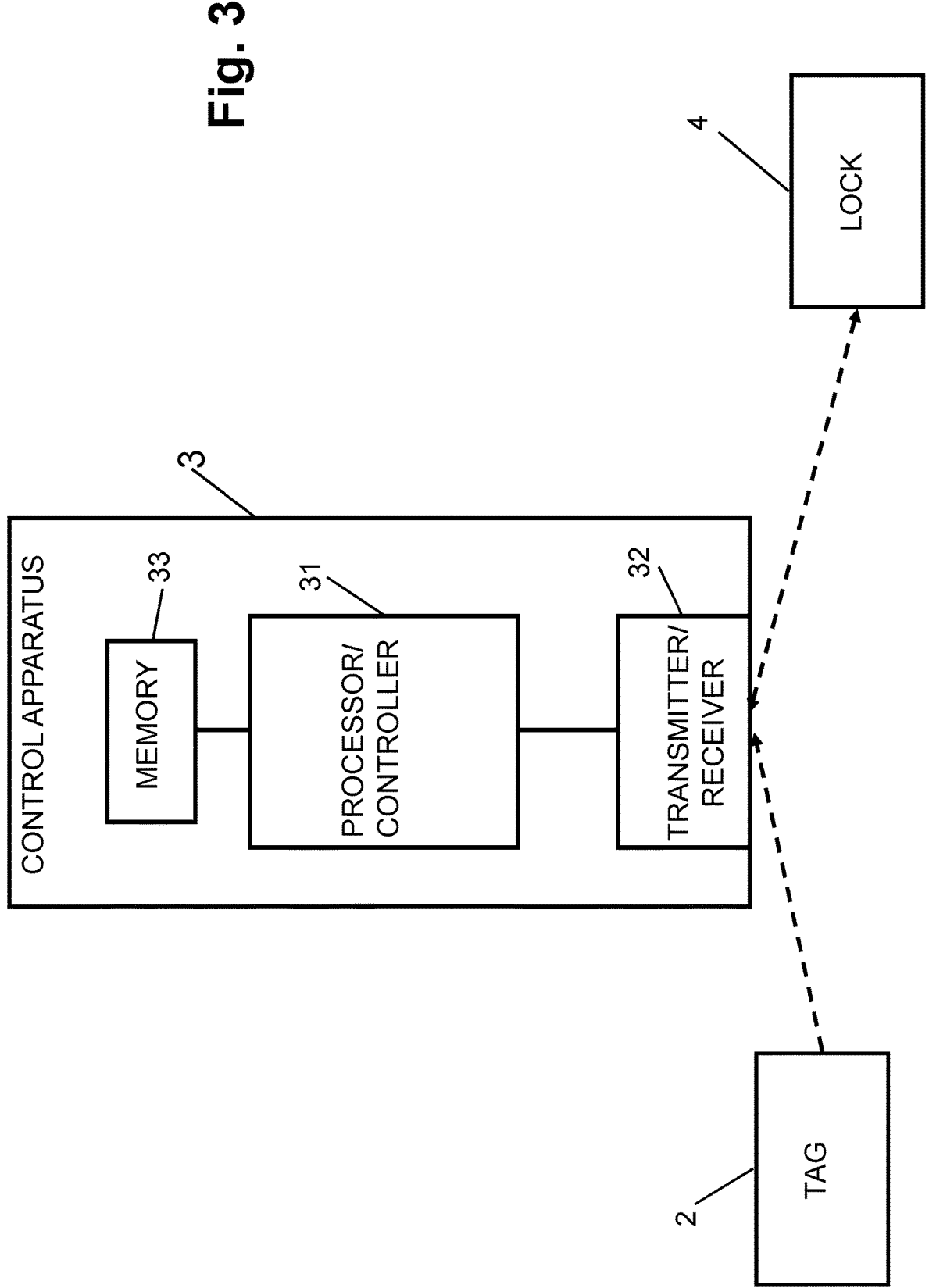
FIG. 3 shows a security apparatus according to a fifth embodiment of the present invention.

In particular, as illustrated in FIG. 3, a security apparatus 3 according to the fifth embodiment comprises a transmitter/receiver 32 and a controller 31. The controller 31 is configured to detect whether an object is present by checking whether the receiver receives an object identifier corresponding to the object (for example from a tag 2), to determine that an object is removed when the object identifier is no longer received, and to issue a warning when the object is removed while no user identifier corresponding to the object identifier is received. The security apparatus 3 may further comprise a memory 33 in which programs to be carried out and data required are stored. Similar as in case of the control apparatus 1 shown in FIG. 1, the transmitter/receiver 32 may also be a receiver only, i.e., the transmitter part or functionality is optional.

Figure 4:
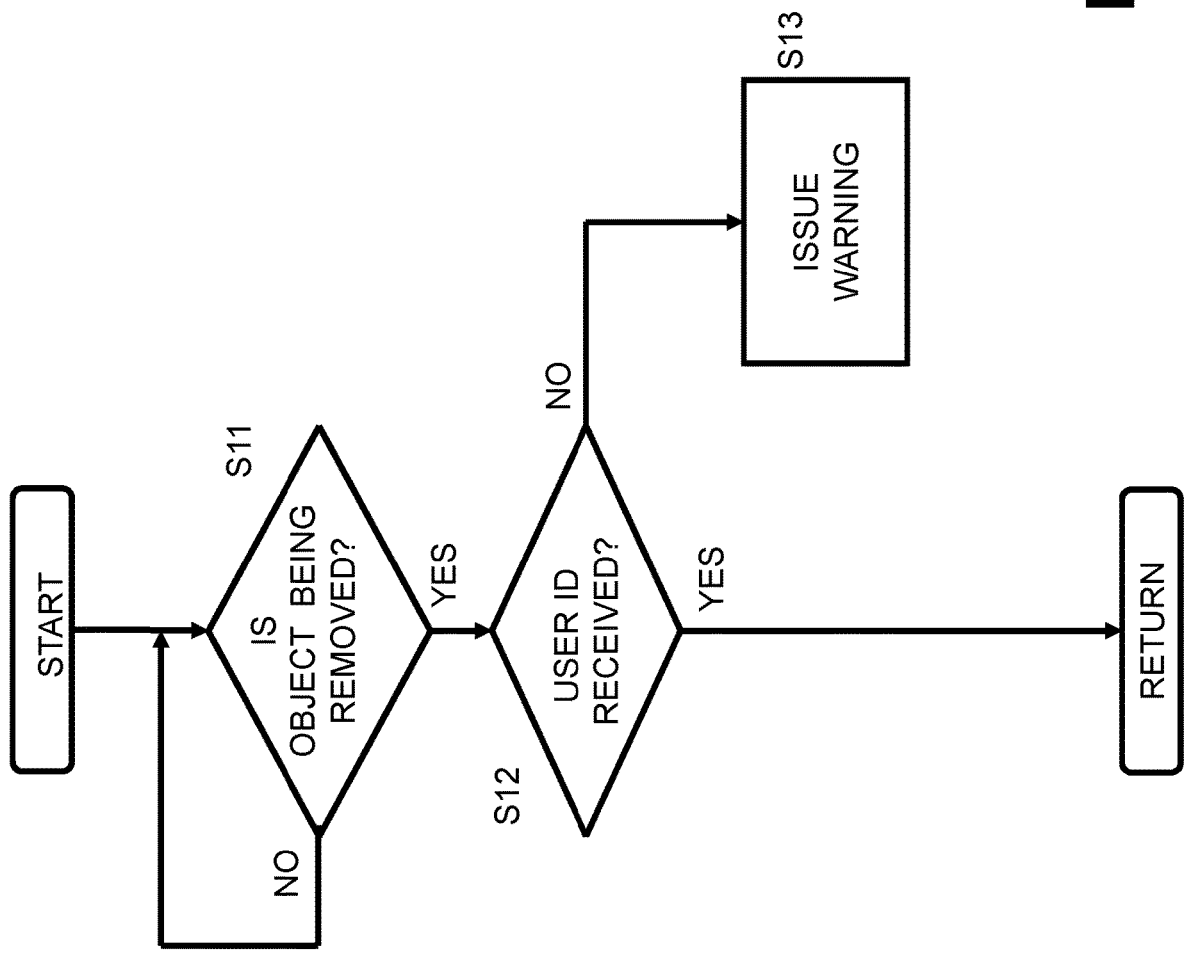
FIG. 4 shows a method according to the fifth embodiment of the present invention.

FIG. 4 shows a method according to the fifth embodiment. In step S11, it is determined whether an object is removed, namely by checking whether the object identifier is no longer received. If this is the case, it is checked in step S12, upon detecting the object is being removed, whether a corresponding user identifier is received. If yes, then the procedure is terminated. If not, i.e., when the object is being removed without that a user identifier is detected, a warning is issued in step S13.

In the following, an example is described in which the above-described security apparatus is applied to a bike storage as described above. The bike storage is equipped with a reader (as an example for the security apparatus including the receiver) capable of sensing all the tags from the bikes. If the bike with the tag is removed from the storage, without tag being "paired" with the mobile app, background system generates an alert via user's mobile app that there may be an attempt to steal one's bike.

According to a modification, the controller may be modified such that, when it receives an instruction from the user corresponding to the user identifier, it overrides issuing the warning. That is, by sending an instruction remotely, the user may allow removing the object (such as a bike), for example when borrowing the bike to somebody else.

According to a further modification of the fifth embodiment, the object may be secured by lock, and the controller may operate this lock. Then, the lock for the object (e.g., the bike) is opened only when a user identifier corresponding to the object identifier is received.

Similar as described above, the user may override this measure, namely such that, when the controller receives an instruction from the user corresponding to the user identifier to open the lock for the object, it opens the lock based on the received instruction. That is, the user may remotely open the lock.

For the example of the bike storage given above, this means that the bike storage may have fixed locking system for the bikes that can be locked and released with the same app locally or remotely, in case done remotely (e.g. releasing the bike for a friend who is borrowing it), the previously described alert functionality is disabled.

Embodiments of the present invention are not limited to the details of the embodiments as described above, and various modifications are possible.

For example, in the above described first and third embodiments, the control apparatus was described as a mobile phone with a corresponding application program ("app"). However, it is not necessary that a mobile phone is used. For example, also another mobile device can be used, on which a corresponding application can run. As a further alternative, a dedicated mobile device can be used which is specifically designed to perform the functions as described in the first embodiment and its modifications.

Moreover, the above-described first and second embodiments may be combined with the third and fourth embodiments. That is, the procedures described above may not only be used for specifying a certain destination floor, but also at the same time for unlocking a door.

It is to be understood that any of the above modifications can be applied singly or in combination to the respective aspects and/or embodiments to which they refer, unless they are explicitly stated as excluding alternatives.

Furthermore, control elements (e.g., the control apparatus 1), as well as corresponding functions as described herein, and other elements, functions or applications may be implemented by software, e.g. by a computer program product for a computer, and/or by hardware. For executing their respective functions, correspondingly used devices, elements or functions may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means etc.) and the like. It is to be noted that in the present specification processing portions should not be only considered to represent physical portions of one or more processors, but may also be considered as a logical division of the referred processing tasks performed by one or more processors.

For the purpose of the present invention as described herein above, it should be noted that embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, a device may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

As described above, an apparatus and a method are disclosed by which it is determined whether a receiver has received an object identifier, and wherein, in case the receiver has received the object identifier, entry control information is created based on the object identifier, and in case the receiver has not received the object identifier, the entry control information is created based on default information.

The invention claimed is:

1. An apparatus comprising:
   a receiver for receiving a user identifier and an object identifier; and
   a controller,
   wherein the controller is configured:
      to determine whether the receiver has received the object identifier;
      to create, in case the receiver has received the object identifier, entry control information based on the object identifier; and
      to create, in case the receiver has not received the object identifier, the entry control information based on default information,
   wherein the user identifier identifies a user, and the object identifier identifies an object moving along with the user, and
   wherein the controller is further configured to determine whether the user identifier and the object identifier correspond to each other.

2. The apparatus according to claim 1, wherein the apparatus is or is part of a mobile device, and the apparatus further comprises:
   a transmitter for sending the created entry control information to an elevator control system or a door key control system.

3. The apparatus according to claim 1, wherein the apparatus is or is part of an elevator control system or a door key control system, and
   wherein the controller is configured to determine, in case the receiver has received the user identifier, whether the receiver has received the object identifier.

4. The apparatus according to claim 1, wherein the entry control information comprises destination indication information for an elevator, and
   wherein the controller is configured:
      to create default destination indication information as the entry control information when no object identifier is received; and
      to create object related destination indication information as the entry control information when the object identifier is received.

5. The apparatus according to claim 1, wherein the entry control information comprises door key control information for an automatic door key, and
   wherein the controller is configured:
      to create default door key control information as the entry control information when no object identifier is received; and
      to create object related door key information as the entry control information when the object identifier is received.

6. The apparatus according to claim 1, wherein the entry control information to be created based on the object identifier is configurable by a user.

7. A system comprising:
   the apparatus according to claim 1; and
   an object device for providing the object identifier.

8. The system according to claim 7, wherein the object device comprises a transmitter for transmitting the object identifier or means for providing a radio frequency identification.

9. The system according to claim 7, wherein the object device is a tag which can be removably attached to the object.

10. A method comprising the steps of:
    determining whether a receiver has received a user identifier and an object identifier;
    determining whether the user identifier and the object identifier correspond to each other;
    creating, in case the receiver has received the object identifier, entry control information based on the object identifier; and
    creating, in case the receiver has not received the object identifier, the entry control information based on default information,
    wherein the user identifier identifies a user, and the object identifier identifies an object moving along with the user.

11. The method according to claim 10, wherein the method is carried out in a mobile device, and wherein the method further comprises:
    sending the created entry control information to an elevator control system or a door key control system.

12. The method according to claim 10, wherein the method is carried out in an elevator control system or a door key control system, and
    wherein the receiver is configured to receive a user identifier, wherein the method further comprises:
       determining, in case the receiver has received the user identifier, whether the receiver has received the object identifier.

13. The method according to claim 10, wherein the entry control information comprises destination indication information for an elevator, and
    wherein the method further comprises:
       creating default destination indication information as the entry control information when no object identifier is received; and
       creating object related destination indication information as the entry control information when the object identifier is received.

14. The method according to claim 10, wherein the entry control information comprises door key control information for an automatic door key, and
    wherein the method further comprises:
       creating default door key control information as the entry control information when no object identifier is received; and
       creating object related door key information as the entry control information when the object identifier is received.

15. The method according to claim 10, wherein the entry control information to be created based on the object identifier is configurable by a user.

16. The method according to claim 10, wherein the object identifier is provided by an object device.

17. The method according to claim 16, wherein the object device comprises a transmitter for transmitting the object identifier or means for providing a radio frequency identification.

18. The method according to claim 16, wherein the object device is a tag which can be removably attached to an object.

19. A computer program product comprising a non-transitory computer-readable storage medium having code means for performing the method according to claim 10, when run on a processor or module.

20. The computer program product according to claim 19, wherein the computer program product is directly loadable into the internal memory of the computer and/or transmittable via a network by means of at least one of upload, download and push procedures.

* * * * *